US008865844B2

(12) United States Patent
Hwang et al.

(10) Patent No.: US 8,865,844 B2
(45) Date of Patent: Oct. 21, 2014

(54) ELECTRODE, METHOD OF PREPARING THE SAME, BINDER COMPOSITION, LITHIUM BATTERY CONTAINING THE ELECTRODE AND THE BINDER COMPOSITION

(75) Inventors: Seung-sik Hwang, Seongnam-si (KR); Jin-hwan Park, Seoul (KR); Myung-dong Cho, Hwaseong-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1060 days.

(21) Appl. No.: 11/404,943

(22) Filed: Apr. 14, 2006

(65) Prior Publication Data
US 2006/0235144 A1    Oct. 19, 2006

(30) Foreign Application Priority Data
Apr. 14, 2005 (KR) .................. 10-2005-0030949

(51) Int. Cl.
| | |
|---|---|
| *B63B 3/13* | (2006.01) |
| *C08G 18/12* | (2006.01) |
| *H01M 10/052* | (2010.01) |
| *H01M 4/04* | (2006.01) |
| *C08L 75/04* | (2006.01) |
| *C08G 18/66* | (2006.01) |
| *H01M 4/62* | (2006.01) |
| *C08G 18/08* | (2006.01) |
| *C08G 18/83* | (2006.01) |
| *H01M 4/139* | (2010.01) |
| *H01M 10/0565* | (2010.01) |
| *C08L 1/08* | (2006.01) |

(52) U.S. Cl.
CPC .............. *C08G 18/833* (2013.01); *C08G 18/12* (2013.01); *H01M 10/052* (2013.01); *H01M 4/0404* (2013.01); *C08L 75/04* (2013.01); *C08G 18/6659* (2013.01); *C08L 1/08* (2013.01); *H01M 4/622* (2013.01); *C08G 18/0823* (2013.01); *H01M 4/621* (2013.01); *H01M 2300/0082* (2013.01); *Y02E 60/122* (2013.01); *H01M 4/139* (2013.01); *H01M 10/0565* (2013.01); *C08G 18/6692* (2013.01)
USPC ........... 525/454; 429/128; 528/256; 29/623.1

(58) Field of Classification Search
USPC ........... 525/454; 429/128; 528/256; 29/623.1
See application file for complete search history.

(56) References Cited

U.S. PATENT DOCUMENTS 4,028,312 A * 6/1977 Ball et al. .......................... 528/73
4,758,483 A * 7/1988 Armand et al. ................ 429/312

(Continued)

FOREIGN PATENT DOCUMENTS

| CN | 1251596 A | 4/2000 |
| JP | 5-226002 | 9/1993 |

(Continued)

OTHER PUBLICATIONS
Derwentacc-No. 1988-060389, Takegawa et al., 1986.*

(Continued)

*Primary Examiner* — Shane Fang
(74) *Attorney, Agent, or Firm* — Christie, Parker & Hale, LLP

(57) ABSTRACT

An electrode including a binder comprising a waterborne polyurethane polymer compound and an electrode active material is provided. The waterborne polyurethane polymer compound improves the binding properties of the electrode. In addition, the polymer compound disperses well in water and is hardened through a crosslinking reaction to increase elastic force, thereby enabling adjustment of elastic and binding forces. As a result, a battery including the polymer compound has excellent recovery and charge/discharge properties.

15 Claims, 10 Drawing Sheets

(56) References Cited

U.S. PATENT DOCUMENTS

| | | | | |
|---|---|---|---|---|
| 4,861,826 | A | * | 8/1989 | Hummerich et al. ......... 524/839 |
| 5,093,386 | A | | 3/1992 | Bishop et al. |
| 5,389,430 | A | | 2/1995 | Yilgöt et al. |
| 5,798,409 | A | * | 8/1998 | Ho ................................. 524/506 |
| 5,912,093 | A | * | 6/1999 | Wen et al. ..................... 429/188 |
| 6,030,421 | A | | 2/2000 | Gauthier et al. |
| 6,077,897 | A | * | 6/2000 | Wen et al. ..................... 524/366 |
| 6,322,923 | B1 | * | 11/2001 | Spotnitz et al. ............... 429/144 |
| 6,455,606 | B1 | | 9/2002 | Kaku et al. |
| 6,576,702 | B2 | * | 6/2003 | Anderle et al. ............... 524/591 |
| 2002/0102464 | A1 | * | 8/2002 | Yoshida et al. ............... 429/300 |
| 2004/0062989 | A1 | | 4/2004 | Ueno et al. |
| 2004/0101753 | A1 | | 5/2004 | Hwang |
| 2005/0231894 | A1 | | 10/2005 | Yoshida et al. |

FOREIGN PATENT DOCUMENTS

| | | |
|---|---|---|
| JP | 5-283103 | 10/1993 |
| JP | 6-143819 | 5/1994 |
| JP | 7-117358 | 5/1995 |
| JP | 2503982 B2 | 4/1996 |
| JP | 8-269429 | 10/1996 |
| JP | 10-21927 | 1/1998 |
| JP | 11-001676 | 1/1999 |
| JP | 11-003712 | 1/1999 |
| JP | 11-323300 | 11/1999 |
| JP | 2000-200608 | 7/2000 |
| JP | 2000-265111 | 9/2000 |
| JP | 2002-256129 | 9/2002 |
| JP | 2002-289174 | 10/2002 |
| JP | 2003-123766 | 4/2003 |
| JP | 2003-257491 | 9/2003 |
| JP | 2003-331848 | 11/2003 |
| JP | 2004-256694 | 9/2004 |
| JP | 2005-044681 | 2/2005 |
| JP | 2006-169503 | 6/2006 |
| JP | 2006-172992 | 6/2006 |
| KR | 1999-025437 | 4/1999 |
| KR | 2001-0025099 | 3/2001 |
| KR | 10-2004-0046139 | 6/2004 |
| KR | 10-2004-0067030 | 7/2004 |
| KR | 10-2004-0078927 | 9/2004 |
| KR | 10-2004-0104400 | 12/2004 |
| KR | 10-2005-0038254 | 4/2005 |
| KR | 10-2006-0055669 | 5/2006 |
| WO | WO 00/33406 | 6/2000 |
| WO | WO 2004/079841 A1 | 9/2004 |
| WO | WO 2004/107481 A1 | 12/2004 |
| WO | WO 2005/101554 A1 | 10/2005 |

OTHER PUBLICATIONS

Korean Patent Abstracts, Publication No. 1020040078927; Publication Date: Sep. 14, 2004; in the name of Han et al.
Korean Patent Abstracts, Publication No. 1020040104400; Publication Date: Dec. 10, 2004; in the name of Han et al.
China Office action dated May 9, 2008 for Chinese Patent application 2006100736453.
Patent Abstracts of Japan, Publication No. 08-269429, dated Oct. 15, 1996, in the name of Yuki Oguchiyoshi et al.
Korean Patent Abstracts, Publication No. 1020040078927 A, dated Sep. 14, 2004, in the name of Jang Seon Han et al.
Korean Patent Abstracts, Publication No. 1020040104400 A, dated Dec. 10, 2004, in the name of Jang Seon Han et al.
Office Action dated Jun. 27, 2007 for corresponding Korean Patent Application No. 10-2005-0030949.
Korean Patent Abstracts corresponding to Registered Korean Patent No. 1999-025437; Publication No. 100249728 B1; Date of Publication: Dec. 28, 1999.
U.S. Office action dated Sep. 9, 2008, for related U.S. Appl. No. 11/639,635.
Office Action dated Jun. 27, 2007 for corresponding Korean Patent Application No. 10-2005-0030949, and English translation.
Chinese Office action dated Jun. 19, 2009, for corresponding Chinese application 2006101593029, with English translation.
U.S. Office action dated Mar. 9, 2010, for related U.S. Appl. No. 11/639,635.
Japanese Office action dated Jun. 15, 2010, for Japanese Patent application 2007-016916.
Japanese Office action dated Jan. 25, 2011, for Japanese Patent application 2007-016916, 2011.
English machine translation of Japanese Publication 11-323300, listed above, 32 pages, 1999.
English machine tra nslation of Japanese Publication 2004-256694, listed above, 41 pages, 2004.
Office action dated Jun. 17, 2011 in cross-referenced U.S. Appl. No. 11/639,635; 12 pages.
Advisory action dated Aug. 30, 2011 in cross-referenced U.S. Appl. No. 11/639,635; 3 pages.
KIPO Registration Determination Certificate dated Nov. 19, 2007, for Korean Patent application 10-2006-0009014, 4 pages.
KIPO Registration Determination Certificate dated Dec. 26, 2007, for Korean priority Patent application 10-2005-0030949, 4 pages.
Patent Abstracts of Japan and machine translation for JP Publication No. 63-15816 A, published Jan. 22, 1988, in the name of Tamaki et al., corresponding to JP Patent No. 2503982 B2, listed above (8 pages).
U.S. Office action dated Oct. 17, 2012, for cross reference U.S. Appl. No. 11/639,635, (15 pages).
U.S. Office action dated May 2, 2013, for cross reference U.S. Appl. No. 11/639,635, (11 pages).
U.S. Notice of Allowance dated Sep. 11, 2013, for cross reference U.S. Appl. No. 11/639,635, (13 pages).
Derwent Abstract of Japanese Publication 10-055798 dated Feb. 24, 1998, (4 pages).

* cited by examiner

ELECTRODE, METHOD OF PREPARING THE SAME, BINDER COMPOSITION, LITHIUM BATTERY CONTAINING THE ELECTRODE AND THE BINDER COMPOSITION

CROSS-REFERENCE TO RELATED PATENT APPLICATIONS

This application claims priority to and the benefit of Korean Patent Application No. 10-2005-0030949, filed on Apr. 14, 2005, in the Korean Intellectual Property Office, the entire content of which is incorporated herein by reference.

FIELD OF THE INVENTION

The present invention relates to an electrode, a method of manufacturing the electrode, a polymer electrolyte composition, and a lithium battery including the electrode and the polymer electrolyte composition. More particularly, the invention is directed to an electrode including a polyurethane binder capable of adjustable elongation and having excellent binding, elastic, and charge/discharge properties.

BACKGROUND OF THE INVENTION

Lithium batteries have high voltages and high energy densities, and have enhanced stability compared to other batteries, such as a Ni—Cd batteries. Due to these advantages, lithium batteries are used as power sources for portable electric applications. However, since smaller, lightweight portable electric applications require power sources having high capacities, batteries having higher operating voltages, longer lifetimes, and higher energy densities than conventional lithium batteries are needed. Such batteries can be developed by improving the performance of various battery components. For example, battery properties are dependent on electrodes, electrolytes, and other battery materials. In particular, electrode properties are dependent on electrode active materials, current collectors, and binders which bind the electrode active materials and current collectors. The amount of lithium ions bound to an active material depends on the amount and type of active material. Consequently, batteries having high capacities can be produced using more active material and using an active material having large intrinsic capacity. In addition, when a binder provides a strong binding force between the active materials or between the active materials and the current collector, electrons and lithium ions move smoothly within the electrode, thereby decreasing the inner resistance of the electrode and enabling relatively high charge/discharge rates.

High capacity batteries require composite electrodes including metal and graphite. The active material of such a composite electrode considerably expands and contracts during charging and discharging. Accordingly, in addition to good binding force, the binder should have good elasticity and recovery properties in order to maintain the original binding force of the binder and the electrode structure even after expansion and contraction.

When fluorinated polyvinylidene fluoride (PVDF) based polymers are used as the binder material, the material is dissolved in a solvent such as N-methyl-2-pyrrolidone. PVDF based polymers have strong binding forces. However, the PVDF based polymer only expands by about 10%. Consequently, a large amount of the PVDF based polymer is needed to obtain a sufficient binding force. In addition, the PVDF based polymer is dissolved in an organic solvent before use, thereby complicating the manufacturing process.

Styrene-butadiene rubber (SBR) can also be used as a binder material and it has good elasticity. However, the binding force of SBR is very weak, resulting in changes in the structure of the electrode after a number of charge/discharge cycles and the reductions in battery capacity and lifetime.

Accordingly, there is a need to develop a waterborne binder having good elasticity and binding properties in order to improve charge/discharge properties of batteries.

SUMMARY OF THE INVENTION

In one embodiment of the present invention, an electrode includes a binder having good elasticity and binding properties.

In another embodiment of the present invention, a method of producing the electrode is provided.

In yet another embodiment of the present invention, a polymer electrolyte composition has high solubility with respect to the electrolyte and good binding capacity with respect to the current collector and active material.

In still another embodiment of the present invention, a lithium battery including the electrode is provided.

According to one embodiment of the present invention, a binder used to form an energy storage device includes a waterborne polyurethane polymer compound. The waterborne polyurethane polymer compound may be prepared by reacting a neutralizer and a chain extender with a polyurethane compound. The polyurethane compound can be obtained by reacting a polyol compound, a diisocyanate compound, and a dispersant.

The dispersant may be a compound having a molecular structure including two hydroxyl groups and at least one group capable of decomposing into a cation or anion. Nonlimiting examples of suitable dispersants include nonionic systems such as dimethylol butanoic acid, dimethylol propionic acid, methylene diethanol amine, polyethylene oxide derivatives and mixtures thereof.

The amount of dispersant may range from about 2 to about 7% by weight based on the total weight of the polyurethane polymer compound.

Nonlimiting examples of suitable neutralizers include triethylamine, sodium hydroxide, potassium hydroxide and lithium hydroxide.

The chain extender may be a C2 to C6 diamine having a relatively small molecular weight. Nonlimiting examples of suitable chain extenders include ethylenediamine, propane diamine, butylenediamine, hexanediamine, isophoronediamine, xylenediamine, diethyltoluenediamine, diethylenetriamine and triethylenetetraamine.

According to another embodiment of the present invention, a binder used to form an energy storage device includes a crosslinked polyurethane polymer compound prepared by reacting a waterborne polyurethane polymer with a crosslinking agent. Nonlimiting examples of suitable crosslinking agents include aziridine, oxazoline, modified diisocyanate and diepoxide compounds.

According to yet another embodiment of the present invention, an electrode includes a binder comprising a waterborne polyurethane polymer compound and an electrode active material.

According to still another embodiment of the present invention, an electrode includes a binder comprising a crosslinked polyurethane polymer compound prepared by reacting a waterborne polyurethane polymer with a crosslinking agent and an electrode active material.

According to still yet another embodiment of the present invention, a method of producing an electrode includes preparing an electrode slurry by simultaneously mixing a waterborne polyurethane polymer compound, an electrode active material, and a crosslinking agent and coating the electrode slurry on a collector before completion of a crosslinking reaction.

According to another embodiment of the present invention, a polymer electrolyte composition includes an ion conductive salt, a polar solvent, and a crosslinked polyurethane polymer compound.

According to yet another embodiment of the present invention, a lithium battery includes the electrode.

According to still another embodiment of the present invention, a lithium battery includes a polymer electrolyte layer including the polymer electrolyte composition.

According to still yet another embodiment of the present invention, a lithium battery includes the electrodes described above and a polymer electrolyte layer including the polymer electrolyte composition described above positioned between the electrodes.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
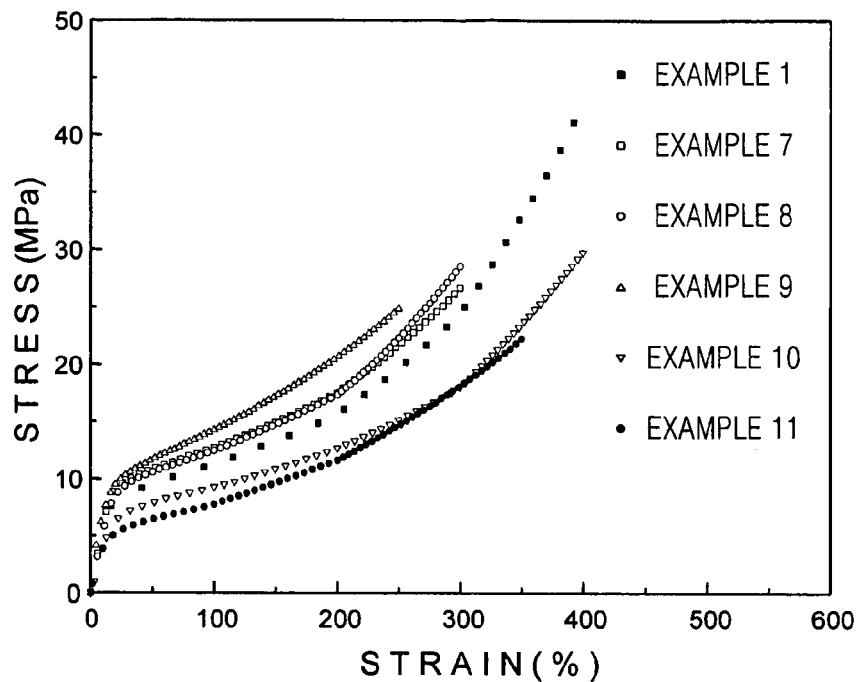
FIG. 1 is a graph of stress vs. strain of the waterborne polyurethane polymer films prepared according to Examples 1 and 7 through 11.

The present invention will now be described with reference to the accompanying drawings.

An electrode according to one embodiment of the present invention includes a waterborne polyurethane polymer compound that improves binding properties. The waterborne polyurethane polymer has good dispersing properties and is hardened through a crosslinking reaction to improve elastic force. Thus, a battery including the electrode has better recovery and charge/discharge properties.

A binder used in an energy storage device according to one embodiment of the present invention includes a waterborne polyurethane polymer compound. The binder including the waterborne polyurethane polymer compound provides an electrode with elastic and binding forces. In addition, the binder can be dispersed in water, eliminating the need for an organic solvent to produce an electrode. Therefore, the manufacturing process for the electrode according to this embodiment is inexpensive, environmentally friendly, and simple.

The waterborne polyurethane polymer compound can be prepared by first preparing a polyurethane compound by reacting a polyol compound, a diisocyanate compound, and a dispersant. The polyurethane compound is then reacted with a neutralizer and a chain extender to form the polyurethane polymer compound.

The diisocyanate compound can be an alicyclic isocyanate, aliphatic isocyanate, or aromatic isocyanate, and has at least two isocyanate groups. Nonlimiting examples of suitable diisocyanate compounds include methylenediphenyl diisocyanate (MDI), polymeric methylenediphenyl diisocyanate (polymeric MDI), tolylene diisocyanate (TDI), lysine diisocyanate (LDI), hydrogenated tolylene diisocyanate, hexamethylene diisocyanate (HDI), xylene diisocyanate (XDI), hydrogenated xylene diisocyanate, naphthalene diisocyanate (NDI), biphenylene diisocyanate, 2,4,6-triisopropylphenyl diisocyanate (TIDI), diphenylether diisocyanate, tolidine diisocyanate (TODI), isophorone diisocyanate (IPDI), 4,4'-dicyclohexylmethane diisocyanate (HMDI), tetramethylxylene diisocyanate (TMXDI), 2,2,4-trimethyl hexamethylene diisocyanate (TMHDI), 1,12-diisocyanatododecan (DDI), norbornane diisocyanate (NBDI), 2,4-bis-(8-isocyanatooctyl)-1,3-dioctylcyclobutane (OCDI), 2,2,4(2,4,4)-trimethyl hexamethylene diisocyanate (TMDI), naphthalene-crosslinked polyphenyl polyisocyanate and the like. These diisocyanate compounds can be used alone or in combination.

Nonlimiting examples of suitable polyol compounds include polymer polyols, ethyleneglycol, 1,2-propylene glycol, 1,3-propyleneglycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β-hydroxy)benzene, p-xylene diol, phenyldiethanolamine, methyldiethanolamine, 3,9-bis-(2-hydroxy-1,1-dimethyl)-2,4,8,10-tetraoxaspiro[5,5]-undecane, and the like. Nonlimiting examples of suitable polymer polyols include polyether polyols, such as polyethyleneglycol, polypropyleneglycol, copolymers of ethylene glycol and propyleneglycol, polytetramethylene etherglycol, and the like. Other nonlimiting examples of suitable polymer polyols include polyester polyol, polycaprolactonediol, polybutadienediol, and the like. However, the polyol compound can also be a polyol having at least three alcohol groups.

The weight average molecular weight (Mw) of the polyol compound ranges from about 200 to about 10000. In one embodiment, the Mw of the polyol compound ranges from about 500 to about 8000. In yet another embodiment, the Mw of the polyol compound ranges from about 1000 to about 6000. When the Mw of the polyol compound is less than 200, the properties of the resulting polyurethane compound deteriorate. When the Mw of the polyol compound is greater than 10000, the viscosity of the resulting polyurethane compound is too high, making the handling of the polyurethane compound difficult.

If necessary, a monohydric compound can be used in the reaction instead of the polyol compound. Nonlimiting examples of suitable monohydric compounds include methanol, ethanol, butanol, ethyleneglycol monoethylether, diethylene glycolmonoethylether and the like. In addition, polyethyleneglycolmonomethylether, polypropyleneglycolmonoethylether, and ethyleneglycol/propyleneglycol copolymer monoethylether can be used instead of the polyol compound. The polyethyleneglycolmonomethylether is prepared by substituting one end of polyethyleneglycol with a methyl group. The polypropyleneglycolmonoethylether is prepared by substituting one end of polypropyleneglycol with an ethyl group. The ethyleneglycol/propyleneglycol copolymer monoethylether is prepared by substituting one end of ethyleneglycol/propyleneglycol copolymer with an ethyl group.

The dispersant according to one embodiment of the present invention provides water dispersion properties to the binder and is a compound having two hydroxyl groups and at least one group capable of decomposing into a cation or an anion. Nonlimiting examples of suitable dispersants include nonionic systems such as dimethylol butanoic acid, dimethylol propionic acid, methylene diethanol amine and polyethylene oxide derivatives. The amount of the dispersant may range from about 2 to about 7% by weight based on the weight of the solid portion of the polyurethane polymer compound. When the amount of the dispersant is less than about 2% by weight, the dispersion stability of the polymer decreases. When the amount of the dispersant is greater than about 7% by weight, the polarity of the polyurethane polymer compound increases due to the excessive amount of the dispersant and the water resistance and chemical resistance of the polyurethane polymer compound decreases.

These carboxylic diols can be neutralized using a base compound or a cationic metal. In particular, the carboxylic diols are chemically neutralized to form salts, which are dispersible in water. Nonlimiting examples of suitable base compounds include triethylamine (TEA), sodium hydroxide (NaOH), potassium hydroxide (KOH), lithium hydroxide (LiOH) and the like. The base compound is selected according to the application or diol used.

The amine according to one embodiment of the present invention is a C2 to C6 diamine having a relatively small molecular weight. Nonlimiting examples of suitable amines include bivalent amines, diethylenetriamine (DETA); triethylenetetraamine (TETA) and the like. Nonlimiting examples of suitable bivalent amines include ethylenediamine (EDA), propane diamine (PDA), butylenediamine (BDA), hexanediamine (HDA), isophoronediamine (IPDA), xylenediamine (XDA) and diethyltoluenediamine (DETDA).

A binder for an energy storage device according to another embodiment of the present invention includes a crosslinked polyurethane polymer compound prepared by reacting a waterborne polyurethane polymer with a crosslinking agent.

In the binder, the crosslinking agent is a compound capable of binding with a functional group and allowing the polyurethane polymer to be dispersible in water. Nonlimiting examples of suitable crosslinking agents include aziridine, oxazoline, modified diisocyanate, and diepoxide compounds. The crosslinking agent does not need to be a single molecule, and can be an oligomer formed of at least two molecules connected together.

An electrode according to one embodiment of the present invention includes a binder having a waterborne polyurethane polymer compound and an electrode active material. The binder having the waterborne polyurethane polymer compound is described above. The electrode active material can be any electrode active material that is commonly used in the related art.

An electrode according to another embodiment of the present invention includes a binder having a crosslinked polyurethane polymer compound, and an electrode active material. The crosslinked polyurethane polymer compound is prepared by reacting a waterborne polyurethane polymer with a crosslinking agent.

The reaction between the crosslinking agent and the waterborne polyurethane polymer causes the binder to lose its ability to disperse in water. As a result, the crosslinked polyurethane polymer compound easily dissolves in an electrolyte solution containing an organic solvent. Consequently, the binder has enhanced compatibility with most electrolyte solutions. In particular, the crosslinking reaction improves the elasticity of the binder, thereby also improving the recovery properties of the binder. Thus, an electrode using the binder can retain its original volume and its original binding force in spite of substantial volume changes occurring during charging and discharging. Therefore, the electrode using the binder exhibits better performance and has a longer lifetime.

A method of producing the electrode, which includes the binder and the electrode active material, will now be described in detail. In order to produce an anode, an anode composite material including an anode active material and a binder is molded into a predetermined shape. Alternatively, the anode composite material can be coated on a current collector, such as a copper film.

In particular, an anode material composition is prepared, and the prepared anode material composition is coated directly onto a laminated copper current collector to produce an anode plate. Alternatively, the anode plate is prepared by casting the prepared anode material composition on a separate support, separating the resulting film from the support and laminating the film on a copper current collector. However, the structure of the anode according to the present invention is not limited, and any other structure can be used.

When a battery has high capacitance, the battery is charged and discharged with a large current. To accomplish this, the electrode is formed of a material having low electrical resistance, and it is common to use a conductive agent to decrease the resistance of the electrode. Nonlimiting example of suitable conductive agents include carbon black, graphite microparticles, and the like. However, the anode according to the present embodiment is conductive, and thus use of a conductive agent is not necessary.

In order to produce a cathode, a cathode active composition is prepared by mixing a cathode active material, a conductive agent, the binder described above, and a solvent. The cathode active material composition is coated directly on a metallic current collector and then dried to prepare a cathode plate. Alternatively, the cathode plate is prepared by casting the cathode active material composition on a separate support, separating the resulting film from the support and laminating the film on a metallic current collector.

The cathode active material can be any lithium containing metal oxide that is commonly used in the related art. Nonlimiting examples of suitable cathode active materials include $LiCoO_2$, $LiMn_xO_{2x}$, $LiNi_{1-x}Mn_xO_{2x}$ where x is 1 or 2, $Ni_{1-x-y}Co_xMn_yO_2$ where $0 \leq x \leq 0.5$, $0 \leq y \leq 0.5$, and the like. More particularly, the cathode active material can be a compound capable of lithium oxidation or reduction, such as $LiMn_2O_4$, $LiCoO_2$, $LiNiO_2$, $LiFeO_2$, $V_2O_5$, TiS, MoS, and the like.

One nonlimiting example of a suitable conductive agent is carbon black. Nonlimiting examples of suitable binders include vinylidene fluoride/hexafluoropropylene copolymer, polyvinylidene fluoride, poly acrylonitrile, polymethyl methacrylate, polytetrafluoroethylene and mixtures thereof. Alternatively, the binder may include a styrene butadiene rubber based polymer. Nonlimiting examples of suitable solvents include N-methylpyrrolidone, acetone, water, and the like. Amounts of the cathode active material, the conductive agent, the binding agent, and the solvent are those commonly known in the related art.

A polymer electrolyte composition according to one embodiment of the present invention includes an ion conductive salt, a polar solvent, and a crosslinked polyurethane polymer compound. The ion conductive salt is dissolved in the polymer electrolyte composition to obtain a high concentration of the ion conductive salt. After dissolving the ion conductive salt in the polymer electrolyte composition, ions are not recombined, and thus ion conductivity does not decrease. The crosslinked polyurethane polymer compound and the ion conductive salt are main components in the polymer electrolyte composition. The ion conductive salt can be any salt commonly used in energy storage devices. Examples of suitable ion conductive salts are described below in connection with the battery embodiment.

In the polymer electrolyte composition, the amount of ion conductive salt may vary according to conditions. For example, the amount of ion conductive salt may range from about 5 to about 1000 parts by weight based on 100 parts by weight of dried crosslinked polyurethane polymer compound. In one embodiment, the amount of ion conductive salt ranges from about 10 to about 500 parts by weight based on 100 parts by weight of dried crosslinked polyurethane polymer compound. In another embodiment, the amount of ion conductive salt ranges from about 10 to about 100 parts by weight based on 100 parts by weight of dried crosslinked polyurethane polymer compound. In yet another embodiment, the amount of ion conductive salt ranges from about 10 to about 50 parts by weight based on 100 parts by weight of dried crosslinked polyurethane polymer compound. When the amount of ion conductive salt is less than about 5 parts by weight, the concentration of ions is low, resulting in significantly lower conductivity. When the amount of ion conductive salt is greater than about 1000 parts by weight, the ion conductive salt may precipitate.

The organic solvent used in the polymer electrolyte is described below in detail. However, the amount of the solvent ranges from about 1 to about 90% by weight based on 100% by weight of the polymer electrolyte composition. In one embodiment, the amount of the solvent ranges from about 25 to about 75% by weight based on 100% by weight of the polymer electrolyte composition. When an excessive amount of the solvent is used, the binding ability of the polymer of the polymer electrolyte is insufficient. The ion conductive polymer electrolyte has high ion conductivity and good binding properties. The ion conductive polymer electrolyte is positioned between a cathode and an anode and strongly binds the cathode and the anode the ion conductive polymer electrolyte can act as a solid electrolyte for various secondary batteries, such as thin-film batteries.

Methods of forming the ion conductive solid polymer electrolyte into a thin film are not limited. For example, the ion conductive polymer electrolyte can be coated to a uniform thickness by roll coating, screen coating, doctor blade methods, spin coating, bar coating, and the like.

Figure 18:
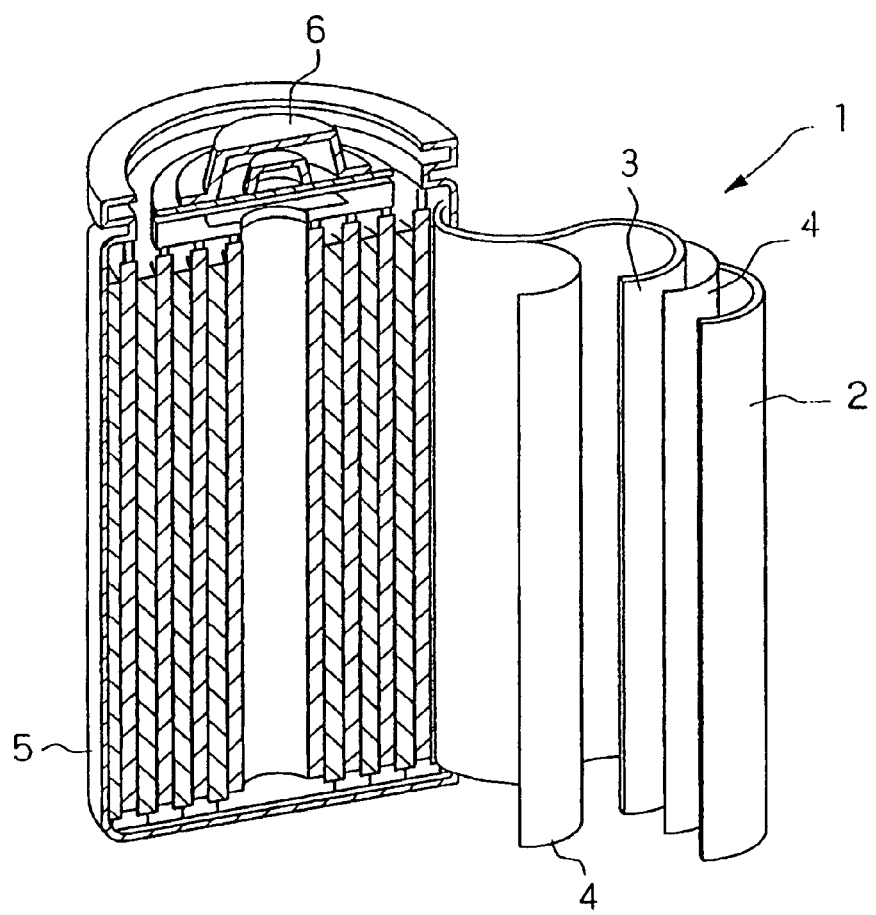
FIG. 18 is a schematic of a lithium battery according to one embodiment of the present invention.

As shown in FIG. 18, a lithium battery 1 according to one embodiment of the present invention includes at least one electrode described above. The electrode can be either the cathode 2 or the anode 3. Alternatively, the battery includes two electrodes as described above, one being the cathode 2 and the other being the anode 3.

A lithium battery 1 according to another embodiment of the present invention includes a conventional cathode 2 and a conventional anode 3, and includes a polymer electrolyte film including the polymer electrolyte composition described above as a separator composition.

A lithium battery 1 according to yet another embodiment of the present invention includes the electrode described above as both the cathode 2 and the anode 3, and a polymer electrolyte layer containing the polymer electrolyte composition described above positioned between the cathode and the anode.

The separator 4 can be any separator commonly used in lithium batteries and includes the polymer electrolyte composition described above. In particular, the separator has low resistance to the flow of ions and good electrolyte retention. Nonlimiting examples of suitable separators include woven or non-woven glass fiber, polyester, Teflon, polyethylene, polypropylene, polytetrafluoroethylene (PTFE), and combinations thereof. In particular, the lithium ion battery includes a rollable separator formed of polyethylene, polypropylene, or the like. The lithium ion polymer battery retains the organic electrolyte. A method of preparing such a separator will now be described.

A separator composition is prepared by mixing a polymer resin, a filling agent, and a solvent. The separator composition is coated directly on an electrode and then dried to prepare a separator film. Alternatively, the separator composition is cast on a support and dried to form a film which is then separated from the support and laminated on an electrode.

The polymer resin can be any material used as a binding agent on an electrode. Nonlimiting examples of suitable polymer resins include vinylidene fluoride/hexafluoropropylene copolymer, polyvinylidene fluoride, polyacrylonitrile, polymethyl methacrylate, and mixtures thereof.

An electrolyte solution may be prepared by dissolving at least one electrolyte in a solvent. Nonlimiting examples of suitable electrolytes include lithium salts such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO2)(C_yF_{2y+1}SO_2)$ where x and y are natural numbers, LiCl, LiI, and the like. Nonlimiting examples of suitable solvents include polypropylene carbonate, ethylene carbonate, diethyl carbonate, ethyl methyl carbonate, methylpropyl carbonate, butylene carbonate, benzonitrile, acetonitrile, tetrahydrofuran, 2-methyltetrahydrofuran, γ-butyrolactone, dioxolane, 4-methyidioxolane, N,N-dimethylformamide, dimethylacetamide, dimethylsulfoxide, dioxane, 1,2-dimethoxyethane, sulfuran, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethylether, and combinations thereof.

The separator 4 is positioned between the cathode plate 2 and the anode plate 3, thereby forming a battery assembly. The battery assembly is wound or folded and loaded into a cylindrical or rectangular battery case 5, and the organic electrolyte solution is injected into the battery case. The battery case 5 is then sealed with a cap assembly 6 to complete the lithium ion battery 1.

Alternatively, the battery assemblies can be stacked to produce a bicell structure and then immersed in an organic electrolyte solution. The resultant product is sealed in a pouch to produce a lithium ion polymer battery.

In a method of producing the electrode described above, a waterborne polyurethane polymer compound, an electrode active material, and a crosslinking agent are simultaneously mixed to prepare an electrode slurry. The electrode slurry is then coated on a current collector before the crosslinking reaction between the waterborne polyurethane polymer compound and the crosslinking agent occurs. As a result, an electrode is produced. The crosslinking reaction is performed in a mixed state with the electrode active material. This allows the binder to be uniformly distributed in the electrode keeping the properties of the electrode uniform throughout the electrode. The crosslinking agent can be simultaneously mixed with the waterborne polyurethane polymer compound and the electrode active material as described above. Alternatively, the crosslinking agent can be mixed with a mixture of the other slurry components before being coated on the current collector.

A method of preparing a crosslinked polyethylene polymer compound according to one embodiment of the present invention will now be described. First, an excessive amount of a diisocyanate compound is reacted with a polyol compound to prepare a prepolymer. The equivalent ratio of diisocyanate compound to polyol compound ranges from about 1.01:1 to about 4:1. In one embodiment, the equivalent ratio ranges from about 1.1:1 to about 3:1. In another embodiment, the equivalent ratio is about 2:1. When the equivalent ratio of diisocyanate compound to polyol compound is outside this range, a high molecular weight polymer is difficult to obtain.

The prepolymer is reacted with a dispersant to prepare a polyurethane compound. Then, the polyurethane compound is formed into a salt using a neutralizer, and the resultant salt is dispersed in water to prepare a waterborne polyurethane compound. At this time, about 15 to about 60% by weight of the waterborne polyurethane compound is solid. The waterborne polyurethane compound is reacted with a chain extender to prepare a waterborne polyurethane polymer compound. The chain extender imparts mechanical properties to the polyurethane compound. Enough chain extender is used to provide an equivalent ratio of residual cyan groups of the unreacted waterborne polyurethane compound to the chain extender of about 1:1. When there is too much or too little of the chain extender, the molecular weight of the polyurethane does not sufficiently increase, making the unique properties of the polyurethane difficult to obtain.

The above processes involving the crosslinked polyethylene polymer compound are well known in the related art. According to one embodiment of the present invention, these processes are performed under a nitrogen atmosphere at a temperature of about 40 to about 90° C. for about 1 to about 8 hours and are not exposed to air. In one embodiment, the processes are performed under a nitrogen atmosphere at about 60 to about 80° C. for about 5 to about 6 hours, and are not exposed to air.

The crosslinked polyurethane polymer compound is prepared by reacting the waterborne polyurethane polymer compound with the crosslinking agent. The crosslinking reaction causes the polyurethane polymer compound to lose its ability to disperse in water.

The present invention will be described in further detail with reference to the following examples. These examples are provided for illustrative purposes only and do not limit the scope of the present invention.

PREPARATION OF POLYURETHANE POLYMER COMPOUND

Example 1

99.59 g of isophorone diisocyanate (IPDI) and 11.19 g of dimethylol butanoic acid (DMBA) were loaded into a 1 L four-neck round-bottom reactor and slowly stirred under a nitrogen atmosphere. 150 g of polytetramethylene ether glycol (PTMEG) was added in two to three portions at 40° C. After the temperature was stabilized, the IPDI, the DMBA, and the PTMEG were reacted at 60° C. for 4 to 6 hours until a theoretical NCO value corresponding to a state where ends of the polyol are connected by IPDI was obtained. Then, the temperature was cooled to 30° C. and 7.53 g of TEA, corresponding to the same number of moles as the DMBA, was added and a neutralization reaction was performed at 40° C. for 30 to 40 minutes. After neutralization, the temperature was cooled to 20° C. or less. 381.54 g of distilled water (30 g less than the 411.54 g of distilled water required to obtain 40 wt % of a solid content) was added to the neutralization product and the resulting product was stirred at a rate of 1000 rpm until dispersion of the neutralization product was stabilized. Then, 13.44 g of EDA (as a chain extender) was dissolved in 30 g of distilled water and slowly added to the reactor. When the EDA was added, a large amount of heat was generated and the temperature of the reactor increased to 40° C. or higher. After the temperature was stabilized at 60° C., the chain extending reaction was performed for about 3 hours to prepare a waterborne polyurethane.

Example 2

A waterborne polyurethane was prepared as in Example 1, except that the amount of DBMA was 9.53 g instead of 11.19 g.

Example 3

A waterborne polyurethane was prepared as in Example 1, except that 150 g of polypropylene glycol was used instead of 150 g of PTMEG.

Example 4

A waterborne polyurethane was prepared as in Example 2, except that 150 g of polypropylene glycol was used instead of 150 g of PTMEG.

Example 5

A waterborne polyurethane was prepared as in Example 3, except that 11.36 g of dimethylol propionic acid was used instead of 11.1 9 g of DMBA.

Example 6

A waterborne polyurethane was prepared as in Example 5, except that 150 g of polycaprolactonediol was used instead of 150 g of polypropylene glycol.

Example 7

A crosslinking reaction was performed by reacting the waterborne polyurethane polymer compound prepared according to Example 1 with 30 mol % of aziridine (trimethylolpropane tris (2-methyl-1-aziridinepropionate)) based on the amount of carboxyl groups in the polymer compound. As a result, a crosslinked polyurethane polymer compound was prepared.

Example 8

A crosslinking reaction was performed by reacting the waterborne polyurethane polymer compound prepared according to Example 1 with 70 mol % of aziridine (trimethylolpropane tris (2-methyl-1-aziridinepropionate)) based on the amount of carboxyl groups in the polymer compound. As a result, a crosslinked polyurethane polymer compound was prepared.

Example 9

A crosslinking reaction was performed by reacting the waterborne polyurethane polymer compound prepared according to Example 1 with 100 mol % of aziridine (trimethylolpropane tris (2-methyl-1-aziridinepropionate) based on the amount of carboxyl groups in the polymer compound. As a result, a crosslinked polyurethane polymer compound was prepared.

Example 10

A crosslinking reaction was performed by reacting the waterborne polyurethane polymer compound prepared according to Example 1 with 30 mol % of oxazoline (POCROSS WS-series Oxazoline Reactive polymer/Water, produced by Nippon Shokubai Inc.) based on the amount of carboxyl groups in the polymer compound. As a result, a crosslinked polyurethane polymer compound was prepared.

Example 11

A crosslinking reaction was performed by reacting the waterborne polyurethane polymer compound prepared according to Example 1 with 70 mol % of oxazoline (POCROSS WS-series Oxazoline Reactive polymer/Water, produced by Nippon Shokubai Inc.) based on the amount of carboxyl groups in the polymer compound. As a result, a crosslinked polyurethane polymer compound was prepared.

Example 12

A crosslinked polyurethane polymer compound was prepared as in Example 7, except that the waterborne polyurethane polymer compound prepared according to Example 6 was used instead of the waterborne polyurethane polymer compound prepared according to Example 1.

Example 13

A crosslinked polyurethane polymer compound was prepared as in Example 8, except that the waterborne polyurethane polymer compound prepared according to Example 6 was used instead of the waterborne polyurethane polymer compound prepared according to Example 1.

Example 14

A crosslinked polyurethane polymer compound was prepared as in Example 9, except that the waterborne polyurethane polymer compound prepared according to Example 6 was used instead of the waterborne polyurethane polymer compound prepared according to Example 1.

Example 15

A crosslinked polyurethane polymer compound was prepared as in Example 10, except that the waterborne polyurethane polymer compound prepared according to Example 6 was used instead of the waterborne polyurethane polymer compound prepared according to Example 1.

Example 16

A crosslinked polyurethane polymer compound was prepared as in Example 11, except that the waterborne polyurethane polymer compound prepared according to Example 6 was used instead of the waterborne polyurethane polymer compound prepared according to Example 1.

Example 17

A crosslinking reaction was performed by reacting the waterborne polyurethane polymer compound prepared according to Example 1 with 30 mol % of oxazoline (POCROSS WS-series Oxazoline Reactive polymer/Water, produced by Nippon Shokubai Inc.) based on the amount of carboxyl groups in the polymer compound.

Example 18

A crosslinking reaction was performed by reacting the waterborne polyurethane polymer compound prepared according to Example 2 with 30 mol % of oxazoline (POCROSS WS-series Oxazoline Reactive polymer/Water, produced by Nippon Shokubai Inc.) based on the amount of carboxyl groups in the polymer compound.

Example 19

A crosslinking reaction was performed by reacting the waterborne polyurethane polymer compound prepared according to Example 3 with 30 mol % of oxazoline (POCROSS WS-series Oxazoline Reactive polymer/Water, produced by Nippon Shokubai Inc.) based on the amount of carboxyl groups in the polymer compound.

Example 20

A crosslinking reaction was performed by reacting the waterborne polyurethane polymer compound prepared according to Example 4 with 30 mol % of oxazoline (POCROSS WS-series Oxazoline Reactive polymer/Water, produced by Nippon Shokubai Inc.) based on the amount of carboxyl groups in the polymer compound.

Example 21

A crosslinking reaction was performed by reacting the waterborne polyurethane polymer compound prepared according to Example 5 with 30 mol % of oxazoline (POCROSS WS-series Oxazoline Reactive polymer/Water, produced by Nippon Shokubai Inc.) based on the amount of carboxyl groups in the polymer compound.

Example 22

A crosslinking reaction was performed by reacting the waterborne polyurethane polymer compound prepared according to Example 6 with 30 mol % of oxazoline (POCROSS WS-series Oxazoline Reactive polymer/Water, produced by Nippon Shokubai Inc.) based on the amount of carboxyl groups in the polymer compound.

Example 23

A crosslinking reaction was performed by reacting the waterborne polyurethane polymer compound prepared according to Example 1 with 70 mol % of oxazoline (POCROSS WS-series Oxazoline Reactive polymer/Water, produced from Nippon Shokubai Inc.) based on the amount of carboxyl groups in the polymer compound.

Example 24

A crosslinking reaction was performed by reacting the waterborne polyurethane polymer compound prepared according to Example 2 with 70 mol % of oxazoline (POCROSS WS-series Oxazoline Reactive polymer/Water, produced from Nippon Shokubai Inc.) based on the amount of carboxyl groups in the polymer compound.

Example 25

A crosslinking reaction was performed by reacting the waterborne polyurethane polymer compound prepared according to Example 3 with 70 mol % of oxazoline (POCROSS WS-series Oxazoline Reactive polymer/Water, produced from Nippon Shokubai Inc.) based on the amount of carboxyl groups in the polymer compound.

Example 26

A crosslinking reaction was performed by reacting the waterborne polyurethane polymer compound prepared according to Example 4 with 70 mol % of oxazoline (POCROSS WS-series Oxazoline Reactive polymer/Water, produced from Nippon Shokubai Inc.) based on the amount of carboxyl groups in the polymer compound.

Example 27

A crosslinking reaction was performed by reacting the waterborne polyurethane polymer compound prepared according to Example 5 with 70 mol % of oxazoline (POCROSS WS-series Oxazoline Reactive polymer/Water, produced from Nippon Shokubai Inc.) based on the amount of carboxyl groups in the polymer compound.

Example 28

A crosslinking reaction was performed by reacting the waterborne polyurethane polymer compound prepared according to Example 6 with 70 mol % of oxazoline (POCROSS WS-series Oxazoline Reactive polymer/Water, produced from Nippon Shokubai Inc.) based on the amount of carboxyl groups in the polymer compound.

Comparative Example 1

Commercially available styrene butadiene rubber (SBR) (BM400B, produced by Japan ZEON Inc.) was used instead of the waterborne polyurethane compound.

Comparative Example 2

Commercially available polyvinylidene fluoride (PVDF) (KF1100, produced by Kureha Inc.) was used instead of the waterborne polyurethane compound.

Stress-Strain Experiment

A stress-strain test was performed on the polyurethane films prepared according to Examples 1, 6, 7 through 11, and 12 through 16 using a universal testing Machine (AMETEK, produced by LLOYD Inc.). The strain speed was 500 mm/min. The test results are shown in FIGS. 1 and 2.

Figure 2:
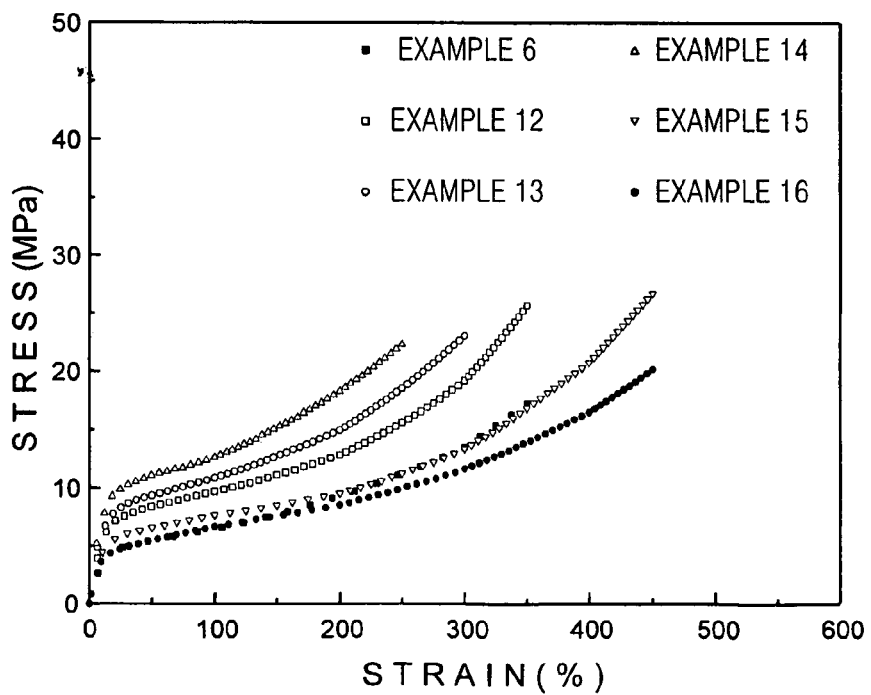
FIG. 2 is a graph of stress vs. strain of the waterborne polyurethane polymer films prepared according to Examples 6 and 12 through 16.

Referring to FIGS. 1 and 2, as the amount of the crosslinking agent increased, the degree of crosslinking increased and the stress increased. However, elongation decreased in all the Examples.

Binding Force Test

Figure 3:
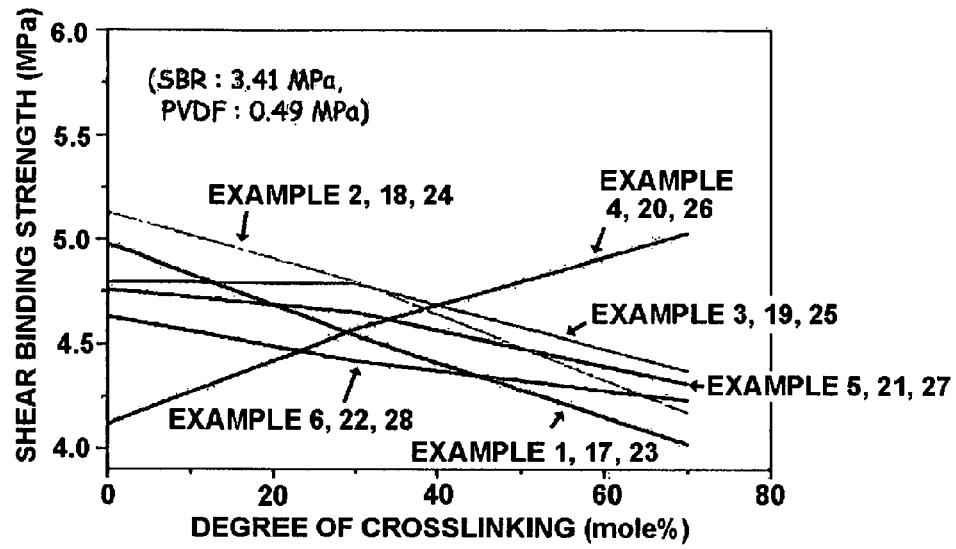
FIG. 3 is a graph of shear binding strength (Lap) between graphite and a polyurethane binder with respect to the degree of crosslinking of a polyurethane binder.
Figure 4:
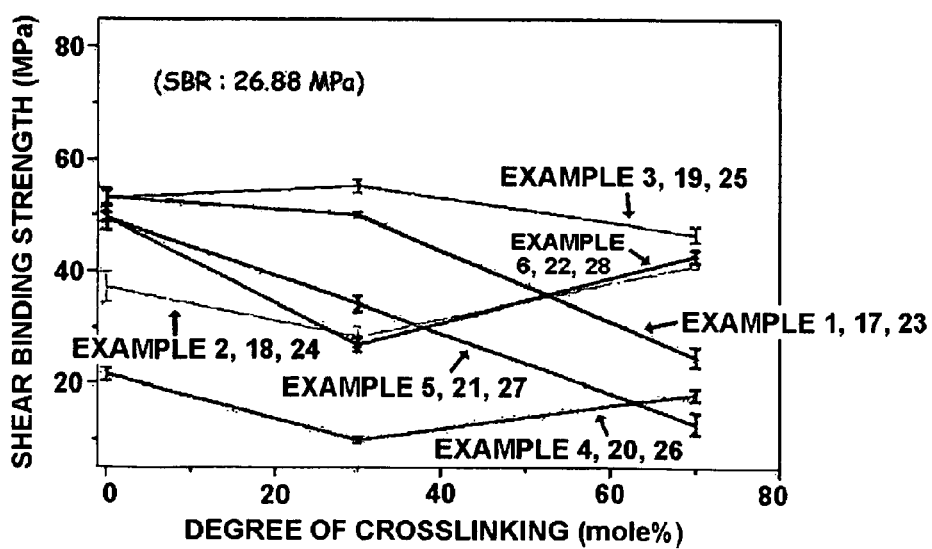
FIG. 4 is a graph of shear binding strength (Lap) between copper and a polyurethane binder with respect to the degree of crosslinking of a polyurethane binder.

The binding forces of the polyurethane films prepared according to Examples 1 through 6, 17 through 22, and 23 through 28, and Comparative Examples 1 and 2 were measured. The experiments were performed using an ASTM 1002 based shear binding strength (Lap) test method. FIG. 3 is a graph of the Lap between graphite and a polyurethane binder with respect to the degree of crosslinking of the polyurethane binder. FIG. 4 is a graph of the Lap between copper and a polyurethane binder with respect to the degree of crosslinking of the polyurethane binder.

Referring to FIGS. 3 and 4, as the degree of crosslinking increased, the binding force decreased. However, the polyurethane films prepared according to Examples 1 through 6, 17 through 22, and 23 through 28 exhibited better binding forces than those prepared according Comparative Examples 1 and 2. As the degree of crosslinking increased, elastic force increased and recovery properties improved. Accordingly, a proper degree of crosslinking can be determined in consideration of the binding and elastic forces.

Production of Anode

Example 29

1.5 g of the waterborne polyurethane prepared according to Example 1 was mixed with 1.5 g of carboxy methyl cellulose (CMC) and 0.62 g of oxazoline (POCROSS WS-series Oxazoline Reactive polymer/Water, produced by Nippon Shokubai Inc.) (corresponding to 50 mol % based on the amount of carboxyl groups in the polymer compound) was added as a crosslinking agent to prepare a binder.

3 g of the binder, 200 g of distilled water, 20 g of a conductive agent (graphite based conductive agent, SFG6, produced by Timcal Inc), and 77 g of an anode active material (a composite active material formed of graphite, silicon metal, and carbon, produced by Osaka Gas Chemical Inc.) were mixed together and then stirred for 60 minutes by a mechanical stirrer to prepare a slurry.

The slurry was coated to a thickness of about 60 to 70 μm on a Cu current collector using a doctor blade, and then dried. The dried product was dried again at 120° C. in vacuum to prepare an anode plate.

Example 30

An anode plate was prepared as in Example 29, except that 100 mol % of aziridine (trimethylolpropane tris(2-methyl-1-aziridinepropionate) was used instead of 50 mol % of the oxazoline (POCROSS WS-series Oxazoline Reactive polymer/Water, produced by Nippon Shokubai Inc.).

Comparative Example 3

An anode plate was prepared as in Example 29, except that SBR was used instead of the waterborne polyurethane compound.

Preparation of Lithium Battery

The anode plates prepared according to Examples 29 and 30 and Comparative Example 3, were each assembled with lithium metal as a counter electrode, a PTFE separator, and an electrolyte (1 M $LiPF_6$ dissolved in a mixture of ethylene carbonate (EC) and diethyl carbonate (DEC) in a volume ratio of 3:7) to prepare 2010 standard coin cells.

Charge/Discharge Test

The prepared coin cells were charged with a constant current of 150 mA per 1 g of the active material until reaching 0.001 V relative to the Li electrode. Then, the coin cells were continuously charged at a constant voltage of 0.001 V until decreasing to 7.5 mA per 1 g of the active material.

The completely charged cells were allowed to sit for about 30 minutes, and then discharged with a current of 150 mA per 1 g of the active material until the voltage reached 1.5 V.

Figure 5:
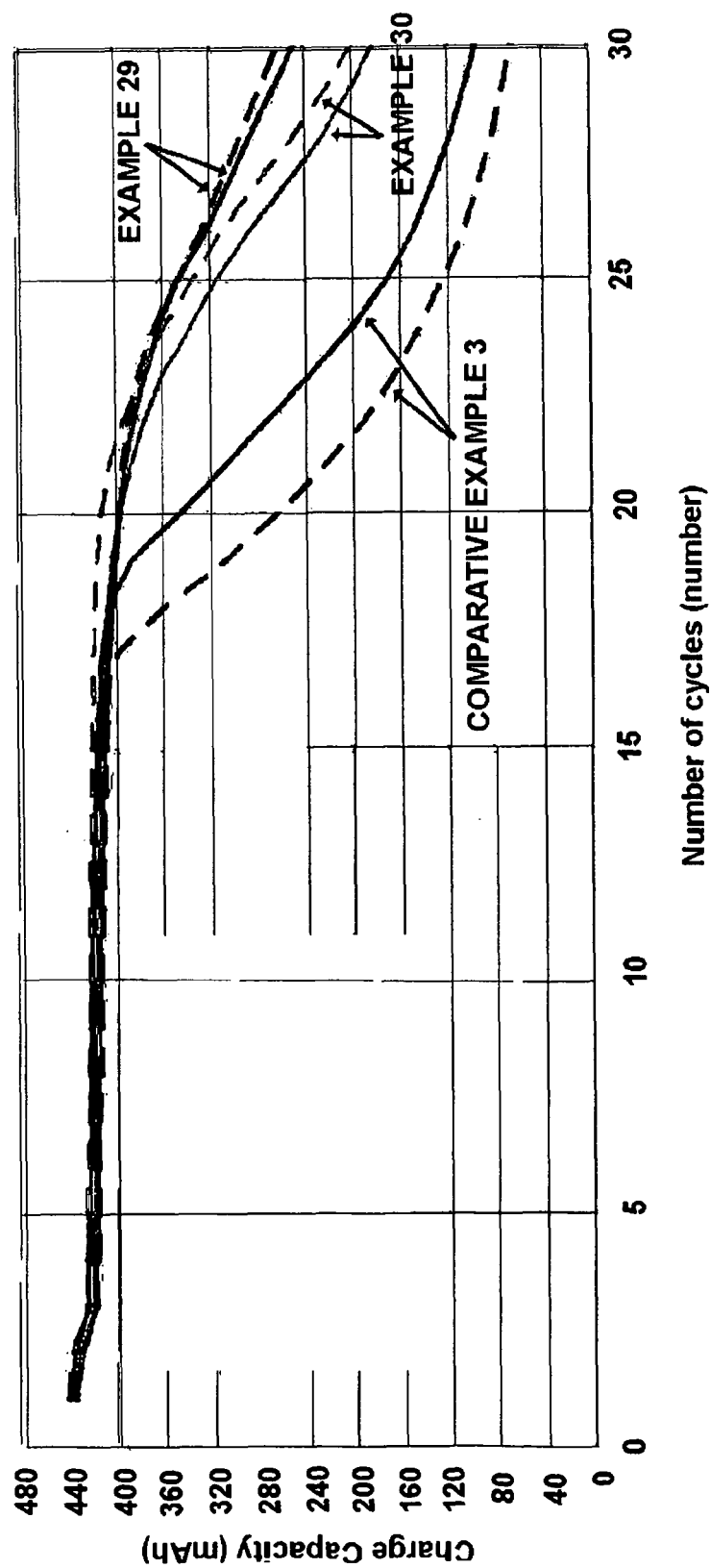
FIG. 5 is a graph of charge capacity vs. number of charge/discharge cycles for the electrodes prepared according to Examples 29 and 30 and Comparative Example 3.
Figure 6:
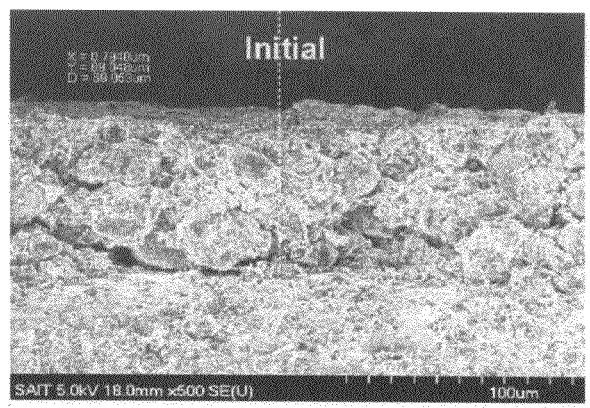
FIGS. 6 through 17 are scanning electron microscope (SEM) images showing changes in thickness of electrodes after varying numbers of charge/discharge cycles.
Figure 7:
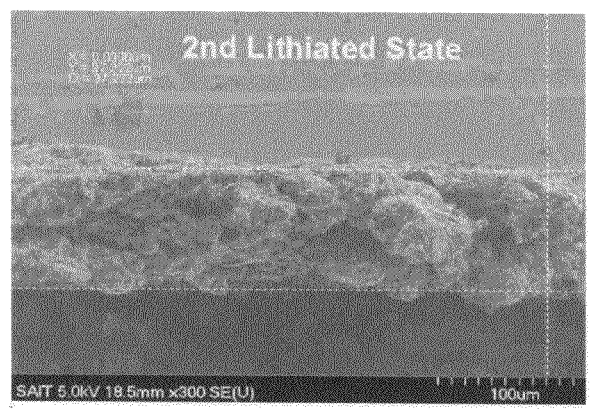
Figure 8:
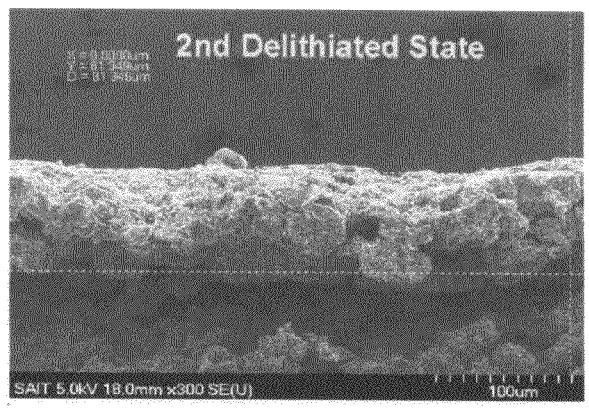

The test results on the lithium batteries prepared according to Examples 29 and 30 and Comparative Example 3 are shown in FIG. 5. Each test was performed twice under the same conditions. Referring to FIG. 5, the discharge capacity of the lithium battery prepared according to Comparative Example 3 began decreasing rapidly after 18 cycles. However, the discharge capacities of the lithium batteries prepared according to Examples 29 and 30 began decreasing after 20 cycles and only decreased gradually. These results show improved discharge capacity when the polyurethane binder is used. In particular, the polyurethane binder has better elasticity and recovery properties than conventional SBR binders. The polyurethane binder also has better binding force than conventional SBR binders. The polyurethane binder retains its binding force with respect to the active material and the current collector even when the volume of the anode active material is changed during charging and discharging. As a result, cracks are not formed in the electrode, enabling ions to move reversibly.

Measurement of Volume Change of Electrode

The thickness of the electrode was measured during the charge/discharge cycles to determine the volume change of the electrode. The thickness of a cross-section of the electrode was measured when the electrode was prepared (Initial), after the electrode was charged and discharged twice (2nd Lithiated State, 2nd Delithiated State), and after the electrode was charged and discharged 50 times (50th Delithiated State). The thicknesses were measured using Scanning Electron Microscopy (SEM). The results are shown in Table 1 and FIGS. 6 through 17.

TABLE 1

|  | Electrode State | Average Thickness (μm) | Thickness Change Rate (%) |
|---|---|---|---|
| Comparative Example 3 | Initial | 69.1 | — |
|  | 2nd Lithiated State | 97.2 | 40.67 |
|  | 2nd Delithiated State | 77.4 | 11.94 |
|  | 50th Delithiated State | 88.3 | 27.79 |
| Example 29 | Initial | 61.9 | — |
|  | 2nd Lithiated State | 84.9 | 37.16 |
|  | 2nd Delithiated State | 65.5 | 5.82 |
|  | 50th Delithiated State | 71.8 | 15.99 |
| Example 30 | Initial | 70.9 | — |
|  | 2nd Lithiated State | 95.6 | 34.93 |
|  | 2nd Delithiated State | 71.4 | 0.78 |
|  | 50th Delithiated State | 72.6 | 2.47 |

Figure 9:
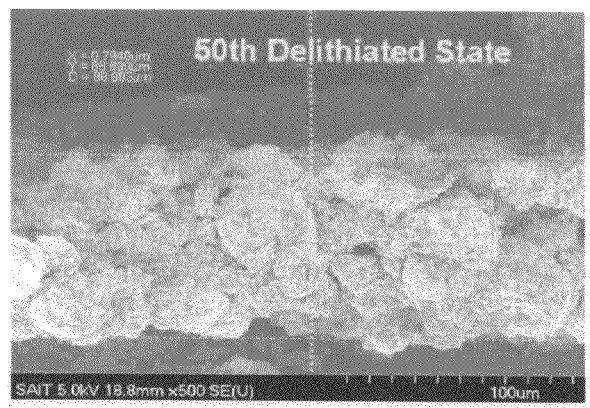
Figure 10:
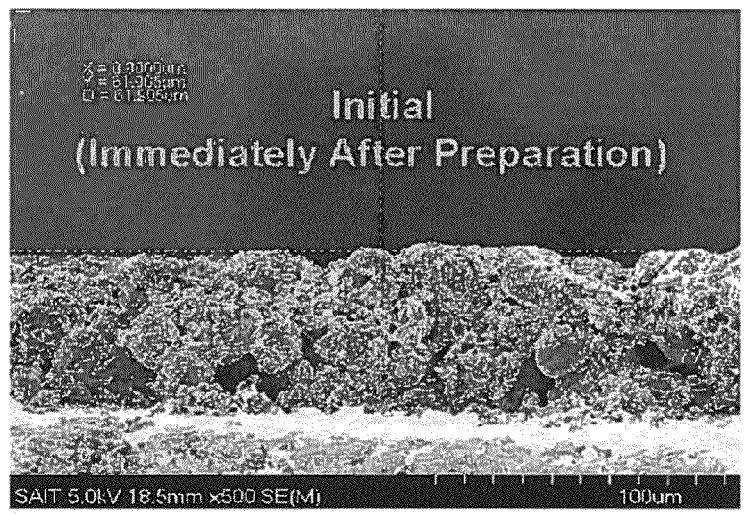
Figure 11:
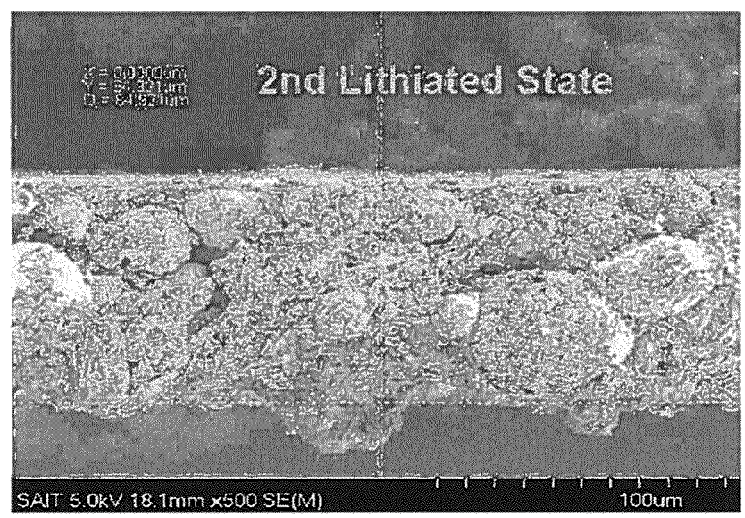
Figure 12:
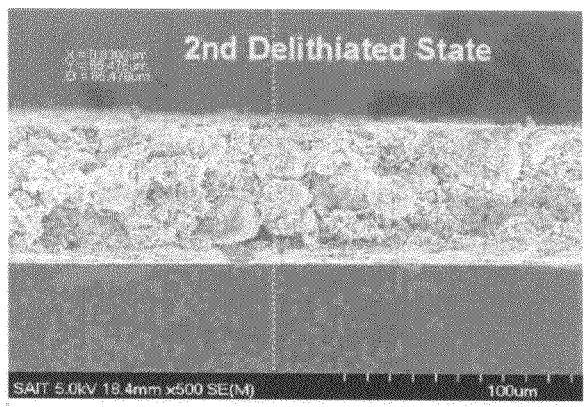
Figure 13:
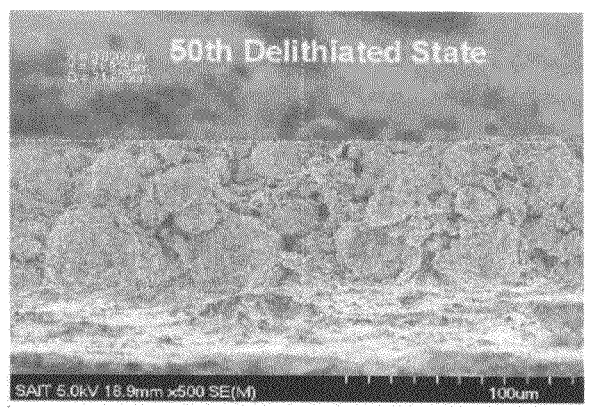
Figure 14:
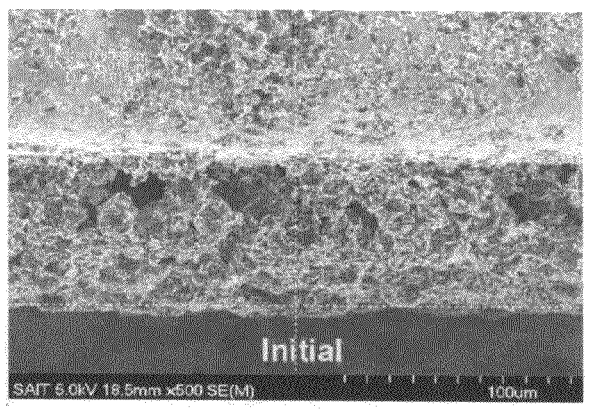
Figure 15:
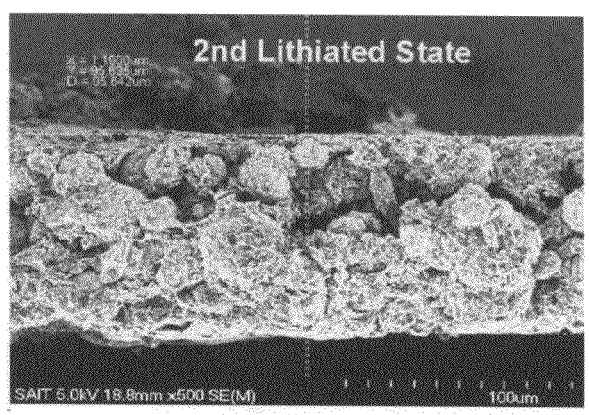
Figure 16:
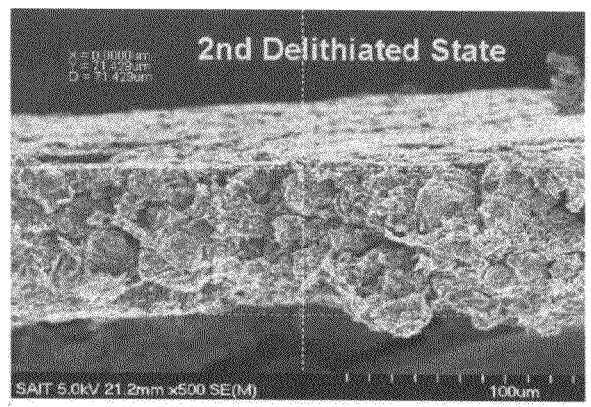
Figure 17:
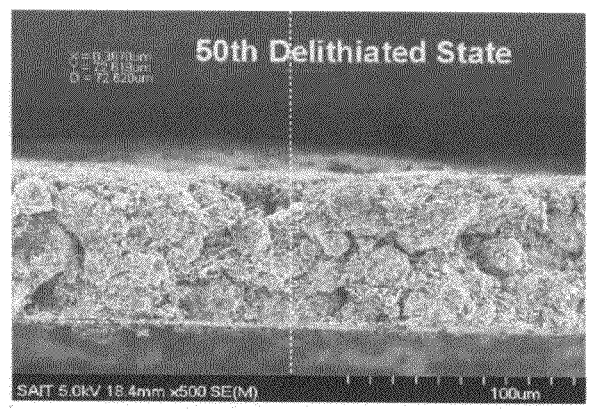

As shown in Table 1, the electrodes prepared according to Examples 29 and 30 exhibited changes in thickness of 16% or less when charged and discharged 50 times. In contrast, the electrode prepared according to Comparative Example 3 exhibited a change in thickness of 27% or greater when charged and discharged 50 times. Therefore, the electrodes prepared according to Examples 29 and 30 exhibited better recovery properties than the electrode prepared according to Comparative Example 3. Such improved recovery properties result from improved elastic forces of the crosslinked polyurethane binders. In addition, the electrode prepared according to Example 30, in which the degree of crosslinking was 100 mol %, exhibited a change in thickness of less than 3% when charged and discharged 50 times. Thus, as the degree of crosslinking increases, the elastic force increases. These results are sown in the SEM images depicted in FIGS. 6 through 17. Referring to FIG. 9, the electrode prepared according to Comparative Example 3 was significantly swollen after 50 charge/discharge cycles. Thus, the electrode prepared according to Comparative Example 3 is expected to have lower density, more pores, lower conductivity, and higher inner resistance, resulting in a shorter lifetime.

An electrode according to one embodiment of the present invention includes a waterborne polyurethane polymer compound for improving binding force. In addition, the polymer compound has excellent dispersion properties and is hardened through a crosslinking reaction to increase the elastic force of the electrode. This allows elastic and binding forces of the electrode to be adjusted. As a result, batteries including the polymer compound have improved recovery and charge/discharge properties.

While the present invention has been illustrated and described with reference to certain exemplary embodiments, it is understood by those of ordinary skill in the art that various changes in form and details may be made to the described embodiments without departing from the spirit and scope of the present invention as defined by the following claims.

What is claimed is:

1. An electrode for a lithium battery, comprising a mixture of an electrode active material capable of oxidizing or reducing lithium and a binder, the binder comprising a crosslinked waterborne polyurethane polymer compound comprising a polyurethane main chain and at least one group capable of decomposing into a cation or anion, wherein the crosslinked waterborne polyurethane polymer compound comprises a waterborne polyurethane polymer crosslinked with greater than 50 mol % to about 70 mol % of a crosslinking agent based on a total number of carboxyl groups in the waterborne polyurethane polymer.

2. The electrode of claim 1, wherein the waterborne polyurethane polymer comprises a reactant of a neutralizer, a chain extender and a polyurethane compound, the polyurethane compound comprising a hydroxyl group-containing compound, a diisocyanate compound, and a dispersant.

3. The electrode of claim 2, wherein:
the dispersant comprises:
two hydroxyl groups;
the at least one group capable of decomposing into a cation or anion; and
a compound selected from the group consisting of dimethylol butanoic acid, dimethylol propionic acid, methylene diethanol amine, nonionic polyethylene oxide derivatives and mixtures thereof.

4. The electrode of claim 2, wherein the neutralizer comprises a compound selected from the group consisting of triethylamine, sodium hydroxide, potassium hydroxide, lithium hydroxide and mixtures thereof.

5. The electrode of claim 2, wherein the chain extender comprises a compound selected from the group consisting of ethylenediamine, butylenediamine, propane diamine, hexanediamine, isophoronediamine, xylenediamine, diethyltoluenediamine, diethylenetriamine, triethylenetetraamine and mixtures thereof.

6. The electrode of claim 2, wherein the diisocyanate compound comprises:
at least two isocyanate groups; and
a compound selected from the group consisting of alicyclic isocyanates, aliphatic isocyanates and aromatic isocyanates.

7. The electrode of claim 2, wherein the hydroxyl group-containing compound is selected from the group consisting of polymer polyols, ethyleneglycol, 1,2-propylene glycol, 1,3-propyleneglycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β- hydroxy)benzene, p-xylene diol, phenyldiethanolamine, methyldiethanolamine, and 3,9-bis-(2-hydroxy-1,1-dimethyl)-2,4,8,10-tetraoxaspiro[5,5]-undecane.

8. The electrode of claim 2, wherein the dispersant is present in the polyurethane compound in an amount ranging from about 2 to about 7% by weight based on the weight of a solid portion of the polyurethane compound.

9. The electrode of claim 2, wherein the hydroxyl group-containing compound has a weight average molecular weight ranging from about 200 to about 10,000.

10. The electrode of claim 1, wherein the crosslinking agent comprises a compound selected from the group consisting of aziridine, oxazoline, diepoxide compounds and mixtures thereof.

11. A method of producing an electrode for a lithium battery, the method comprising:
    mixing a waterborne polyurethane polymer compound comprising a polyurethane main chain and at least one group capable of decomposing into a cation or anion, an electrode active material capable of oxidizing or reducing lithium, and greater than 50 mol % to about 70 mol % of a crosslinking agent based on a total number of carboxyl groups in the waterborne polyurethane polymer compound to prepare an electrode slurry;
    coating the electrode slurry on a collector before performing a crosslinking reaction; and
    performing the crosslinking reaction to form a crosslinked waterborne polyurethane polymer compound.

12. A lithium battery comprising the electrode of claim 1.

13. A lithium battery comprising:
    an anode and a cathode, wherein at least one of the anode and the cathode comprises the electrode of claim 1; and
    a polymer electrolyte layer comprising:
        an ion conductive salt;
        a polar solvent; and
        a crosslinked polyurethane polymer compound,
        wherein the crosslinked polyurethane polymer compound comprises a reactant of a waterborne polyurethane polymer and a crosslinking agent.

14. The electrode of claim 1, wherein the crosslinked waterborne polyurethane polymer compound is uniformly distributed in the electrode.

15. The electrode of claim 1, wherein the mixture of the electrode active material capable of oxidizing or reducing lithium and the binder comprises the crosslinked waterborne polyurethane polymer compound crosslinked in the presence of the electrode active material.

* * * * *